US010635346B2

(12) United States Patent
Hodes et al.

(10) Patent No.: US 10,635,346 B2
(45) Date of Patent: Apr. 28, 2020

(54) SELF-TRIMMING OF DATA STORED IN NON-VOLATILE MEMORY USING DATA STORAGE CONTROLLER

(71) Applicant: Western Digital Technologies, Inc., San Jose, CA (US)

(72) Inventors: Avichay Haim Hodes, Kfar-Ben Nun (IL); Guy Freikorn, Oranit (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 4 days.

(21) Appl. No.: 16/051,366

(22) Filed: Jul. 31, 2018

(65) Prior Publication Data

US 2019/0377512 A1    Dec. 12, 2019

Related U.S. Application Data

(60) Provisional application No. 62/683,472, filed on Jun. 11, 2018.

(51) Int. Cl.
*G06F 3/06* (2006.01)
*G08B 13/196* (2006.01)
*G06F 12/02* (2006.01)

(52) U.S. Cl.
CPC ............ *G06F 3/0658* (2013.01); *G06F 3/068* (2013.01); *G06F 3/0608* (2013.01); *G06F 12/0246* (2013.01); *G08B 13/19673* (2013.01)

(58) Field of Classification Search
CPC ...... G06F 3/0658; G06F 3/0608; G06F 3/068; G06F 12/0246; G08B 13/19673
See application file for complete search history.

(56) References Cited

U.S. PATENT DOCUMENTS

| 8,924,476 | B1* | 12/2014 | Granstrom | ....... H04N 21/23103 709/204 |
| 2007/0022092 | A1* | 1/2007 | Nishizawa | ........ G06F 16/24568 |
| 2013/0275391 | A1* | 10/2013 | Batwara | ................ G06F 16/125 707/689 |
| 2018/0103011 | A1* | 4/2018 | Li | .......................... H04W 24/00 |
| 2018/0373807 | A1* | 12/2018 | Huang | .................... G06F 16/81 |

OTHER PUBLICATIONS

NVM Express; "Non-Volatile Memory Express" Revision 1.3a, dated Oct. 24, 2017; 287 pages.

* cited by examiner

*Primary Examiner* — Hiep T Nguyen
(74) *Attorney, Agent, or Firm* — Loza & Loza, LLP; Gabriel Fitch

(57) ABSTRACT

The present disclosure describes technologies and techniques for use with a data storage controller (such as a non-volatile memory (NVM) controller) to implement self-trimming of media data. In illustrative examples, an NVM controller stores a stream of video data in a NAND storage device, such as video obtained by a security camera. The controller also stores time stamps corresponding to portions of the video data. The controller then periodically (or during idle times) scans the stored information to identify video data that has exceeded a maximum data lifetime, such as data older than one week. Such data is deemed to be old/expired and is trimmed by the controller (by, e.g., marking corresponding entries in an allocation table as deleted or invalid). In this manner, the controller performs self-trimming of older video data to, for example, limit write amplification. NVMe examples are provided.

25 Claims, 15 Drawing Sheets

SELF-TRIMMING OF DATA STORED IN NON-VOLATILE MEMORY USING DATA STORAGE CONTROLLER

CLAIM OF PRIORITY UNDER 35 U.S.C. § 119

The present Application for Patent claims priority to Provisional Application No. 62/683,472 entitled "SELF-TRIMMING OF DATA STORED IN NON-VOLATILE MEMORY USING DATA STORAGE CONTROLLER," filed Jun. 11, 2018, which is assigned to the assignee hereof and hereby expressly incorporated by reference herein.

FIELD

The subject matter described herein relates to data storage devices and controllers. More particularly, the subject matter relates, in some examples, to the trimming of time sensitive data stored within a non-volatile memory (NVM) using a data storage controller.

INTRODUCTION

The demand for high definition (HD) video recording is increasing, particularly in connection with vehicle dashboard cameras (i.e. dashcams), security cameras, and various Internet-of-Things (IoT) devices. Often, users seek to store only the most recently obtained video data, perhaps just data for the last day or the last week. Issues can arise when storing and maintaining such time-sensitive media data on non-volatile memory (NVM) flash storage devices, such as NAND storage devices operating under the control of a data storage controller. NAND technology, in particular, imposes constraints on the storage and erasure of data not found with conventional hard disk drive (HDD) technology. Flash NAND devices may also have a limited lifetime in terms of the number of writes and erasures that can be performed.

It would be desirable to facilitate the efficient storage and removal of time-sensitive data within flash NAND devices or similar SSD devices.

SUMMARY

One embodiment of the present disclosure provides a method for use by a data storage controller for controlling a non-volatile memory (NVM) device, including: storing a stream of data obtained over a period of time in the NVM device; storing time-based parameters corresponding to portions of the stream of data; subsequently identifying portions of the stream of data stored within the NVM device that exceed a time-based threshold based on the corresponding time-based parameters; and trimming the portions of the stream of data that exceed the time-based threshold.

Another embodiment of the present disclosure provides a data storage controller for controlling an NVM device, including: a data stream storage controller configured to store a stream of data obtained from a host device in the NVM device; a time-based parameter storage controller configured to store time-based parameters corresponding to portions of the stream of data; a data expiration controller configured to identify portions of the stream of data stored within the NVM device that have expired; and a trim controller configured to trim the portions of the stream of data that have expired.

Yet another embodiment of the present disclosure provides a data storage system, including: an NVM device; and a data storage controller having a processor configured to store a stream of input data obtained from a host device in the NVM device, store time-based parameters corresponding to portions of the stream of data, identify portions of the stream of data stored within the NVM device that are older than a maximum permissible age, and trim the portions of the stream of data stored in the NVM device identified as older than the maximum permissible age.

Still yet another embodiment of the present disclosure provides an apparatus for controlling an NVM device, including: means for storing an input stream of data in the NVM device; means for storing data expiration parameters corresponding to portions of the input stream of data; means for identifying portions of the input stream of data stored within the NVM device that have expired based on the data expiration parameters; and means for trimming the portions of the stream of data stored in the NVM device that have expired.

BRIEF DESCRIPTION OF THE DRAWINGS

The subject matter described herein will now be explained with reference to the accompanying drawings of which.

DETAILED DESCRIPTION

Figure 1:
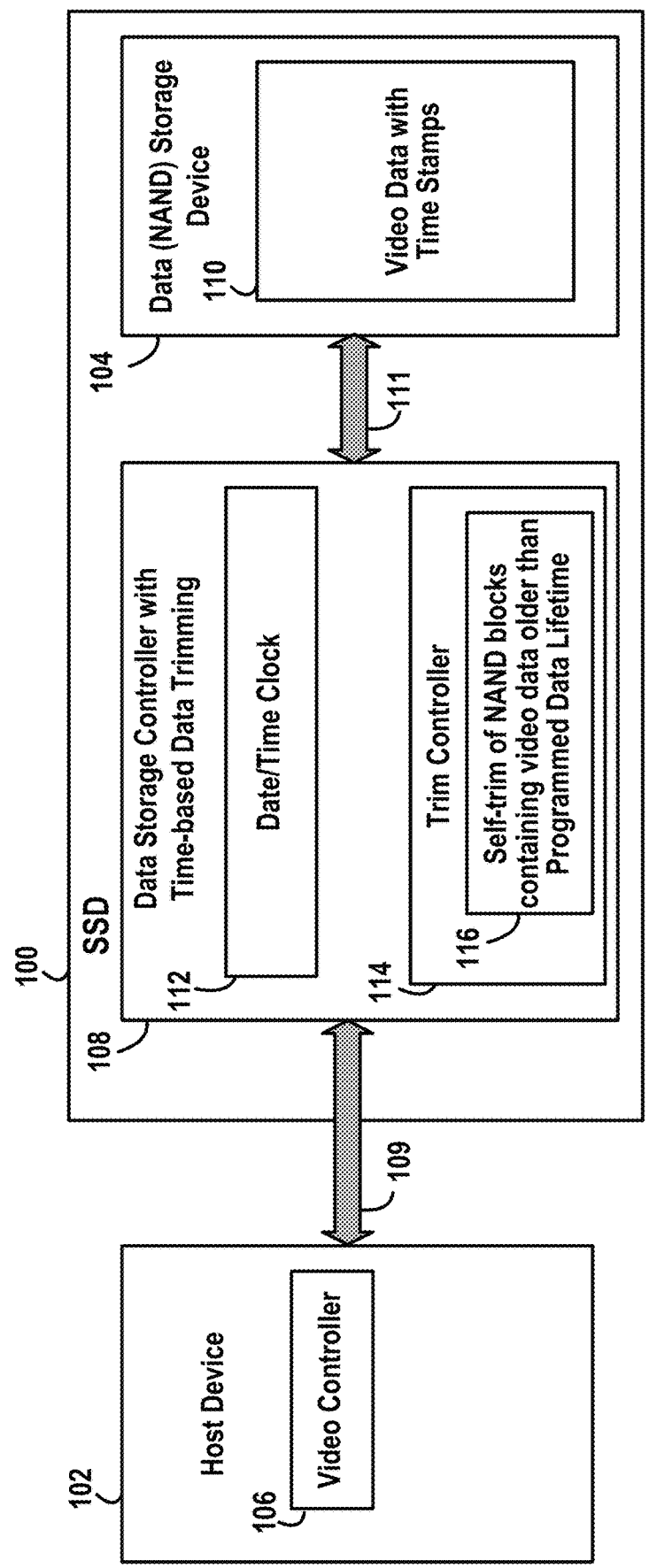
FIG. 1 illustrates a data storage system having a data storage controller and a data storage device (such as a NAND), where the data storage controller is equipped to perform self-trimming operations to trim video data that exceed a data lifetime threshold.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for controlling the storage and removal of time-sensitive data, such as video/audio data from dashcams, security cameras, and IoT devices, within a flash NAND storage device (or other Solid State Drive (SSD) devices). Some examples herein relate to non-volatile memory (NVM) SSD storage systems configured for use with the NVM Express (NVMe) system, wherein an NVM data storage controller (i.e. a device controller) is configured to control access to an NVM device such as a NAND storage device (hereinafter, "NAND") using NVMe protocols. The NVMe system is a scalable host controller interface for use with systems SSDs utilizing Peripheral Component Interconnect (PCI) Express (PCIe). See, e.g., NVM Express standard, Revision 1.3a, Oct. 24, 2017. However, as least some features described herein are applicable to other data storage devices, drives, systems or protocols.

As noted in the Introduction Section above, issues can arise when storing and maintaining time-sensitive media data on NANDs since NANDs impose constraints on the storage and erasure of data not found with conventional hard disk drive (HDD) technology. In particular, when writing data to a typical NAND, the write can only change a 1 to 0 but cannot change a 0 to 1 within the NAND storage elements. Hence, before writing new data to a NAND, an erase is performed first to reset all bits within a block of the NAND memory to 1. Thereafter, new data can be written during a flash write operation by selectively changing some of the 1's to 0's within the block to thereby encode the data within the block.

Due to the constraints on storing and erasing data in NANDs, trim operations or trim commands may be initiated by a host device that notify the SSD which particular blocks of data are no longer considered to be in use and can be wiped internally. Trimming involves logically deleting the data by, for example, marking the corresponding allocation table entry for the data as deleted, as invalid, or as unwritten. Trimmed sectors or blocks can be ignored in a garbage collection cycle. Without trim commands, significant degradation in write performance may occur in the SSD over time (referred to as write amplification). One advantage of trimming is that it enables garbage collection of the SSD to skip the trimmed data rather than moving it, thus saving time by not rewriting the trimmed data. Hence, with trimming, the data is not actually deleted or overwritten, at least not initially. Eventually, the data will be overwritten as new data is stored in the same physical location of the NAND.

An example of a trim command issued by a host device is TRIM within the ATA command set, and another is UNMAP in the Small Computer System Interface (SCSI) command set. The NVMe command set includes a generic Dataset Management command that performs a deallocate operation that performs trim. With NVMe, a logical block may be deallocated using the Dataset Management, a Sanitize command, or a Write Zeroes command. (The operation of the deallocate function of NVMe is thus similar to the Data Set Management with Trim feature of ATA and the UNMAP command of SCSI.) Herein, depending upon the particular SSD, trimming can include the functions associated with one or more of ATA TRIM, SCSI UNMAP, NVMe deallocate, as well as NVMe sanitize and NVMe write zeroes, or other commands that perform similar functions to reduce write amplification. Ordinarily, trimming is initiated by the host device and not initiated or performed on its own by the SSD.

Issues can arise with dashcam/security camera video, etc., where large volumes of video data are constantly (or very frequently) received by an SSD and need to be quickly stored in the NAND of the SSD. Unless trimming is performed efficiently, the NAND of the SSD might not have free space readily available to write new incoming data, perhaps causing storage delays, buffer overflows, or other problems that, in at least some scenarios, might result in the loss of some data. Moreover, each block of a NAND memory array may accommodate only a limited number of write operations before that block of memory can no longer reliably store new data. And so with NANDs, it is important to efficiently choose when and how to trim blocks of memory to permit new data to be stored without unduly limiting the lifetime of the device. With dashcam/security camera video, these issues can be especially important since large volumes of video data may need to be stored temporarily and then replaced with new video data after only a day or two, perhaps only after an hour or so.

Herein, solutions are provided for use by a data storage controller to initiate and efficiently perform self-trimming operations within a NAND or similar NVM device.

Still further, the software applications that run within host devices (such as the software apps of dashcams, security cameras, etc.) are often designed for use with HDDs, not flash NANDs. With HDD technology, bits can be easily switched from 1's to 0's or vice versa, and so, in practice, trimming need not be performed. Additionally, HDD's typically have much longer lifetimes than NANDs. Hence, with many host devices, trimming is not performed or, if performed, it is not done efficiently. Hence, software applications within dashcams, security cameras, etc.—that have been designed under the assumption the data is to be stored in an HDD, rather than in a NAND—may not properly trim data blocks within the NAND, thus significantly reducing the lifetime of the NAND due, for example, to write amplification.

The solutions provided herein for use by a data storage controller allow the controller to perform self-trimming to relieve the host device of the need to control the trimming operations. Hence, host applications need not be designed (or redesigned) to specifically accommodate SSD storage technology rather than HDD storage technology. That is, solutions are provided herein that offload trimming management from the host device to the data storage controller and implement the trimming in a manner that efficiently takes into account the unique needs of high-volume/time-sensitive data storage, as with dashboard cameras, security cameras, etc. (Note, that if the host device is equipped to send trim commands to the SSD, the SSD will also perform those host-initiated trim commands. That is, the self-trim described herein can be in addition to any trim operations initiated by the host.)

In various examples described herein, an NVM data storage controller for use with a NAND is configured to store a stream of time-sensitive or time-encoded data in the NAND, such as a stream of video data from a dashcam or security camera, while efficiently controlling trim operations within the NAND. In at least some examples, the data storage controller stores time-based parameters (or "temporal parameters" or "data lifetime parameters") corresponding to portions or blocks of the stream of data. The parameters may include, e.g., time stamps indicating when the data was first recorded. The parameters are used by the data storage controller to determine when stored data has expired or has otherwise become obsolete, out-of-date, old, etc., e.g. when the data has exceeded a maximum age beyond which the data will no longer be maintained. Depending upon the particular application, the maximum permissible age (or "maximum data lifetime") for data retention might be, e.g., one hour, one day, or one week (though it can be programmed to any desired value). The data storage controller periodically scans data it has previously stored to identify any data that has expired (based on an examination of the time-based parameters) and then trims NAND blocks containing the expired data. In some examples, scanning is also performed whenever the data storage controller is otherwise idle. Arrangements may be made with host designers to allow the SSD to notify the host of its self-trim operations. Additionally, arrangements may be made for configuring the host device (or its applications) to provide the SSD with parameters such as a frequency value specifying how often self-trimming operations should be performed by the SSD, or the maximum data lifetime value, assuming such is programmable by the host device.

Notably, in at least some examples, the self-trim operation is performed to trim old data even if the NAND is not yet full. That is, the data storage controller does not wait until it must trim data to make room for new in-coming data. Rather, the data storage controller trims any and all data that has exceeded the programmed maximum age (or maximum data lifetime). This helps facilitate the efficient trimming of blocks of data in the NAND to allow for the efficient writing of new blocks of data (rather than, e.g., having the controller only trim just enough data from a full NAND to accommodate storage of an incoming quantity of new data and, in so doing, possibly causing increasing fragmentation of the NAND memory space). Trimming of all data exceeding a certain programmed age may also allow a user to be assured that data beyond a certain age is not maintained in the SSD, which may be important in applications where a host device is only permitted to save data up to a maximum age or time.

Moreover, by configuring the data storage controller to perform time-based self-trimming operations, software applications within host devices need not be designed (or re-designed) to manage such trimming on their own. Hence, legacy security cameras that were designed for use with HDDs may be conveniently used with flash NAND devices. Still further, these features additionally help to: a) reduce host management and hence reduce host overhead; and b) improve NAND management efficiency by, e.g., optimizing the available over-provisioning of the NAND during operation (where over-provisioning relates to the amount of memory reserved for use with garbage collection and other functions), which impacts write amplification and hence the overall device endurance. In this regard, by configuring the data storage controller to control trimming, the amount of NAND memory devoted to over-provisioning can be selected or optimized to reduce write amplification and increase device endurance (by, for example, taking into account the amount of trimming to be performed).

Exemplary Data Storage Controller Embodiments

FIG. 1 illustrates, at a high level, an SSD data storage system 100 equipped to store data obtained from a host device 102 in a NAND storage device 104. The host device 102 may be, for example, a security camera or vehicle dashcam provided with a video controller 106, and the data may include, e.g., streams of time-sensitive high-definition video or other media data. The data storage system 100 includes a data storage controller 108 (which may also referred to as a memory controller) configured to control the storage of the data in the NAND 104 and to perform self-trim operations using procedures that are based on the relative age of the data obtained from the host device 102. That is, the data storage controller 108 is configured for time-based self-trimming of previously stored data. For data write operations, the data storage system 100 obtains data from the host device 102 (via a bus 109) and stores the data in NAND 104 (via a bus 111) under the control of the data storage controller 108. In the example of FIG. 1, the NAND 104 includes a video data storage area or storage component 110 for storing video data and corresponding time stamps (or other suitable data lifetime parameters that may be used to identify video data to be trimmed from the video data storage area 110).

One example of a data lifetime parameter or time-based parameter is a recordation time stamp that records when a corresponding string or portion or block of video data was first obtained or recorded. By comparing a recordation time stamp against the current time, as maintained by a date/time clock 112, a trim controller 114 of the data storage controller 108 may thereby determine the "age" of a particular portion of the video data and can then determine whether the data exceeds a maximum permissible age threshold or "programmed data lifetime" (set, in one example, to twenty-four hours). If so, a self-trim component 116 of the trim controller 116 operates to trim data within NAND blocks of NAND 104 containing the video data that was found to be older that the programmed data lifetime. Depending upon the particular SSD implementation, this may involve marking a corresponding entry in an allocation table (or within other stored metadata) as deleted, invalid, or unwritten.

Herein, a time stamp is any identifier that identifies a time associated with corresponding data and, depending on the particulars, the time stamp may include the date, month and year, as well as the hour, minute, second, and, if appropriate, individual fractions of a second. In some examples, a recordation time stamp records the time at which data was first stored in the NAND (as may be appropriate for systems where the data storage controller 108 generates time stamps as video data is stored) but, in other examples, the recordation time stamp might record when the data was first obtained by the host device (as may be appropriate for systems where the host device 102 instead generates the time stamps as video data is obtained and appends the time stamps to the video data).

Another example of a data lifetime parameter or time-based parameter is an expiration time stamp that instead specifies when a corresponding portion of video data will expire. The expiration time stamp may be set, for example, to a time twenty-four hours after the video data was recorded. By comparing the expiration time for a particular portion of video data against the current time, the trim controller 114 can likewise determine if the data has expired and hence should be trimmed. Still other parameters might be used as "data lifetime parameters" or "expiration parameters" or "time-based parameters" to allow the data storage controller to assess whether a particular portion of recorded data should be trimmed. Moreover, other procedures or algorithms might be used by the data storage controller to detect whether a particular portion of recorded data should be trimmed. Generally speaking, any parameter or procedure may be used or exploited as long as it provides a clear indication or clear definition of what constitutes "expired" or "obsolete" or "trimmable" data so a determination may be made as to whether particular data should be trimmed.

Note that FIG. 1 illustrates only selected features of an exemplary system. A more complete system configured in accordance with NVMe is described below. Moreover, the discussion of FIG. 1 has primarily focused on the storage of data to the NAND 104 and subsequent trimming of the data from the NAND 104. The system is also equipped to retrieve data (i.e. perform read operations) from the NAND 104 and to perform other related functions. Additionally, although the main examples herein pertain to NAND devices, aspects of the techniques described herein are also applicable to other NVM storage devices that benefit from trimming, such as shingled magnetic recording devices (SMDs), and at least some aspects of the techniques are generally applicable to any SSD storage device.

Figure 2:
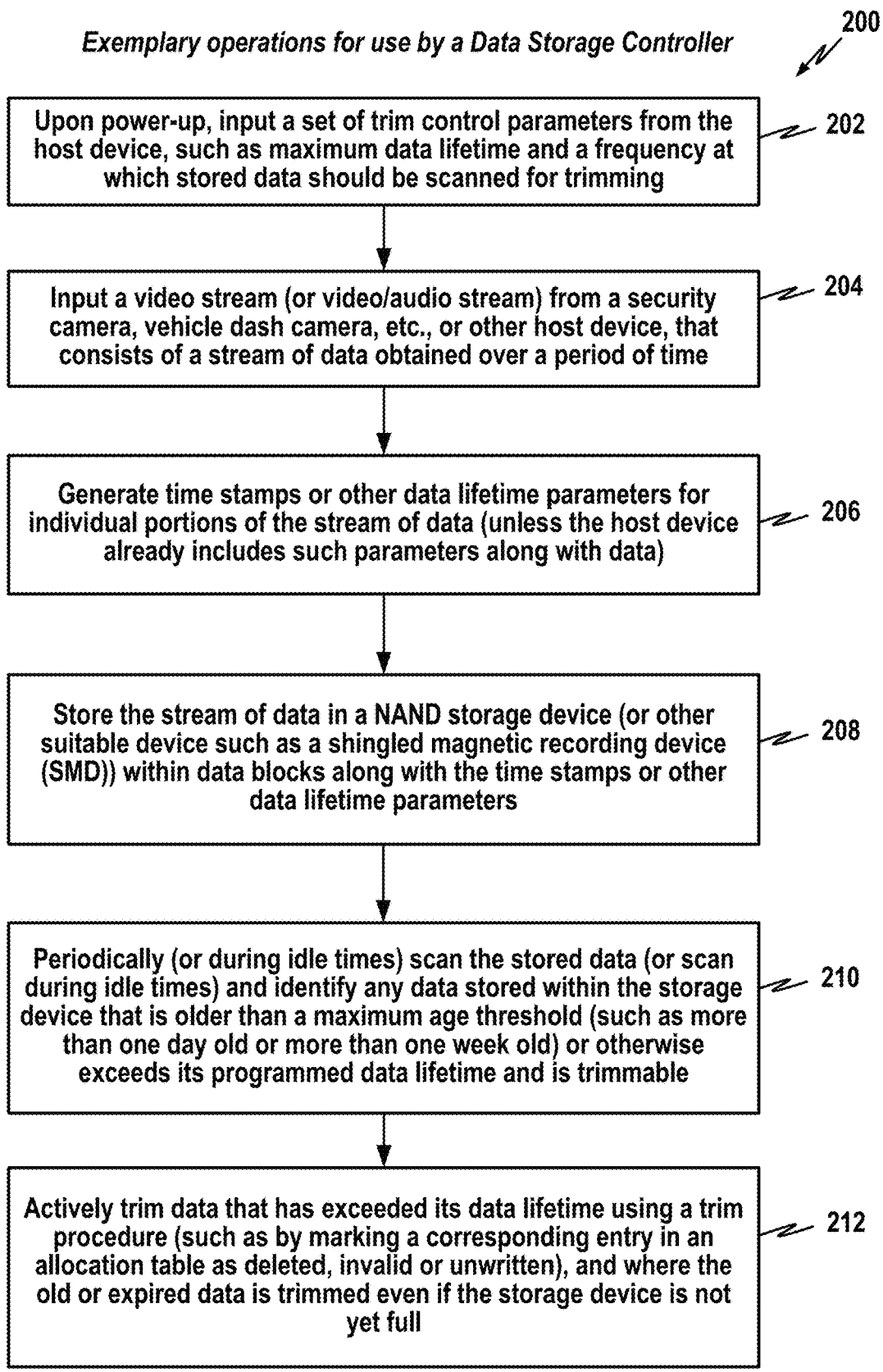
FIG. 2 is a flow chart summarizing video data processing operations performed by the controller of FIG. 6, including operations for trimming older (expired) video data.

FIG. 2 summarizes some of these features via a flowchart 200. Briefly, at 202, upon power-up, the data storage controller inputs a set of trim control parameters from the host device, such as a maximum data lifetime parameter and a frequency at which stored data should be scanned for trimming. At 204, the data storage controller inputs a video stream (or other media stream such as video/audio stream) from a security camera, vehicle dashboard camera, etc., or other host device, that consists of a stream of data obtained over a period of time (or multiple streams of data). At 206, the data storage controller generates time stamps or other suitable data lifetime parameters for individual portions of the stream of data (unless the host device has already included or appended such parameters along with data). At 208, the data storage controller stores the stream of data in a NAND NVM storage device (or other suitable device such as an SMD) within data blocks along with the time stamps or other data lifetime parameters. At 210, the data storage controller periodically scans the stored data subject to the programmed frequency (and/or scans the data during idle times) to identify any data stored within the storage device that is older than a maximum age threshold (such as more than one day old or more than one week old) or otherwise exceeds its programmed data lifetime (and hence has expired or is otherwise deemed obsolete and trimmable). At 212, the data storage controller actively trims data that has exceeded its data lifetime using a trim procedure (such as by marking a corresponding entry in an allocation table as deleted, invalid or unwritten), and where the old or expired data is trimmed even if the storage device is not yet full.

Figure 3:
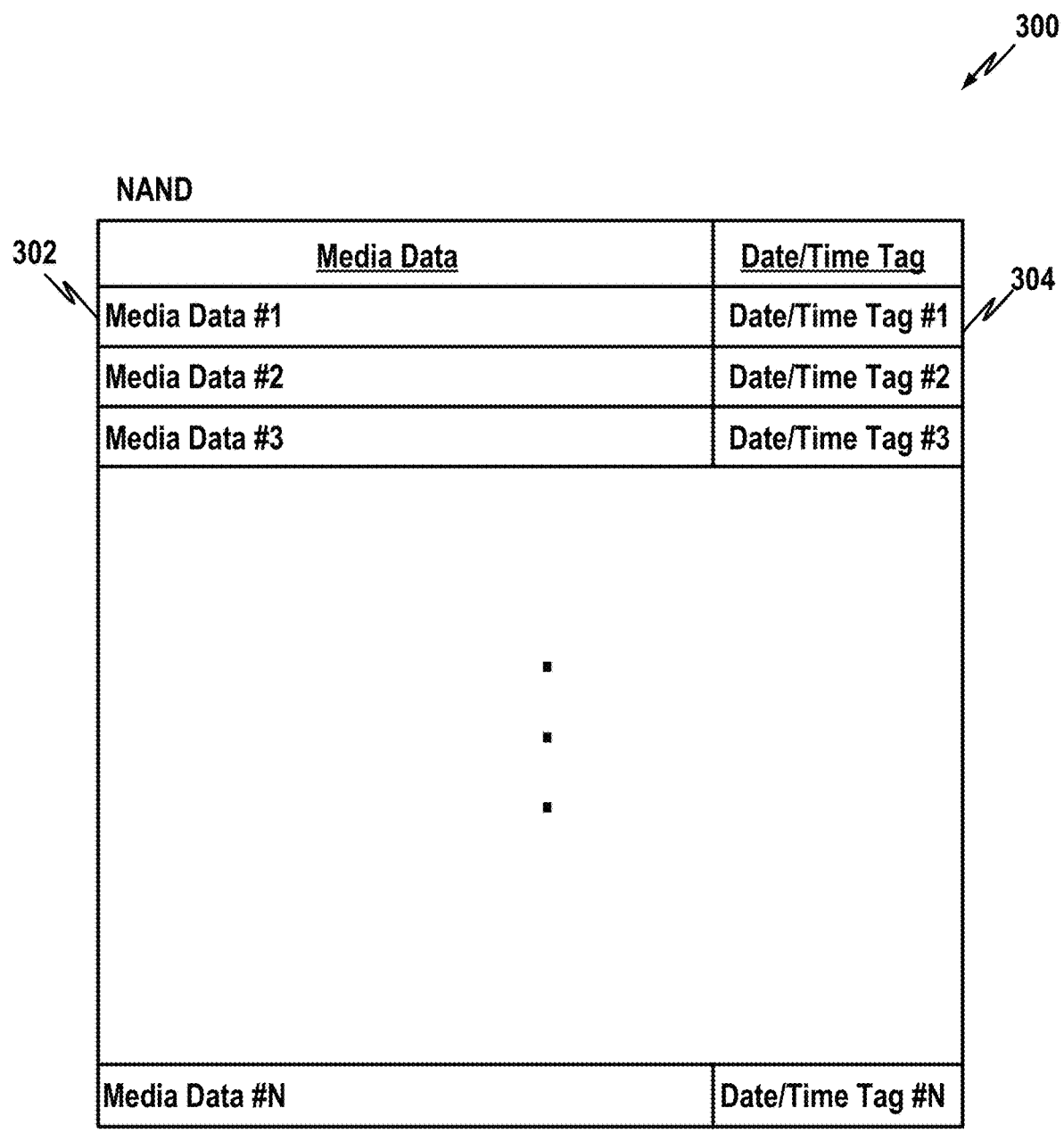
FIG. 3 illustrates a portion of an exemplary NAND memory showing the storage of time stamps along with media data to allow older (expired) video data to be identified.

FIG. 3 illustrates a portion of a NAND 300 in which media data and time stamps are stored together. Briefly, NAND 300 stores a set of N blocks or strings or portions of media data 302 (such as video data) along with N corresponding time stamps 304 (referred to as "date/time tags" in the figure). Each portion of media data 302 might include, for example, one minute of video, consecutively recorded and stored together in a block of the NAND. The corresponding date/time tag 304 may store the particular date/time at which the minute's worth of video begins (or perhaps the particular date/time at which the minute's worth of video ends). The data storage controller connected to the NAND 300 periodically (and/or during idle times) scans the date/time tags 304 to find any that indicate that the corresponding media data has now expired and should be trimmed. The data storage controller then trims the corresponding media data from the NAND and also trims the data/time tags.

As already explained, data is trimmed even in the NAND is not full. And so, assuming there is additional free space on the NAND, newly-received video data is not necessarily stored in the space just freed by the most recently trimmed data. Rather, newly-received video data might be stored elsewhere on the NAND, in accordance with whatever procedures the data storage controller ordinarily uses to select where new data is to be stored (which may, for example, exploit algorithms that seek to maximize the write lifetime of the overall NAND). Eventually, newly received data will be written into blocks of memory that have been previously trimmed. Assuming that the maximum data lifetime is properly set relative to the expected rate at which new data is received from the host device, the NAND should not overflow. That is, the maximum data lifetime should be set so as to ensure that old data will be trimmed before the NAND risks an overflow of data. In the event the NAND becomes full despite the trimming of old data, and there is no room for newly received video data, the data storage controller will issue an appropriate data overflow error to the host device (as flash devices customarily do when provided with too much data to store). Alternatively, the device might be programmed to seek out and trim the oldest data (even if that data has not exceeded the maximum data lifetime) so that the latest data can be stored (and, if so, warning signals can be issued to the host to notify the host there is a storage problem to be addressed).

As noted, depending upon the type of time-based data lifetime parameter that is used (e.g. a recordation time stamp or an expiration time stamp) different logic may be used to assess whether a particular block of data should be trimmed.

Figure 4:
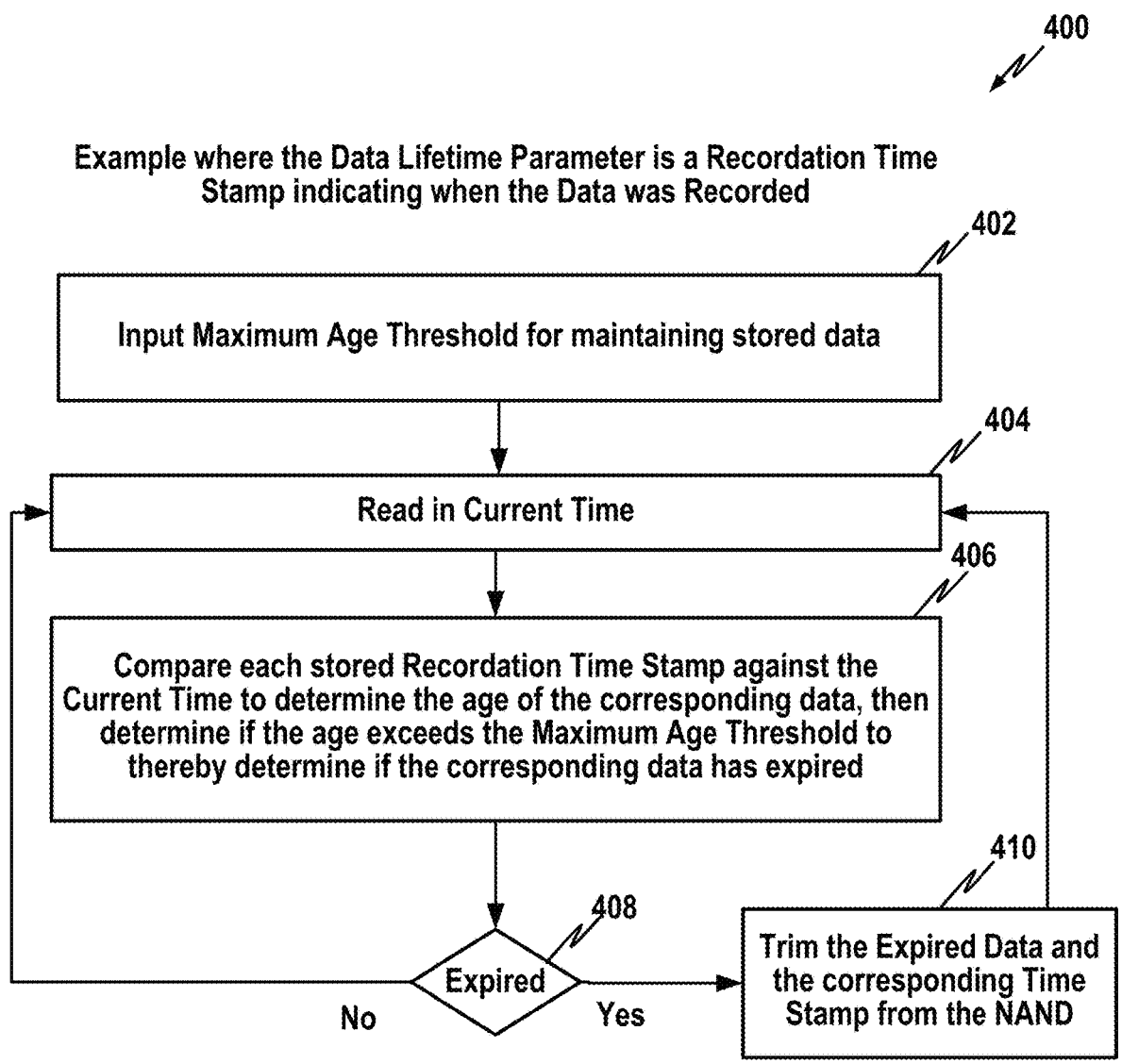
FIG. 4 is a flow chart summarizing a procedure for identifying older (expired) video data based on time stamps that record when corresponding data was first obtained/stored.

FIG. 4 illustrates a procedure 400 for trimming data based on a recordation time stamp (i.e. a time stamp indicating when a corresponding portion of data was first recorded or obtained). Briefly, at 402, the data storage controller inputs the maximum age threshold for maintaining stored data (or other similar maximum lifetime parameter or value). At 404, the data storage controller reads in the current time and, at 406, the data storage controller compares each stored recordation time stamp against the current time to determine the age of the corresponding data, then determine if the age exceeds the maximum age threshold to thereby detect if the corresponding data has expired. If the corresponding data has expired, as determined at decision block 408, the data storage controller trims the expired data and the corresponding time stamp from the NAND, at 410. Otherwise, the controller returns to 404 to update the current time and repeat the process to again identify any data to be trimmed.

Figure 5:
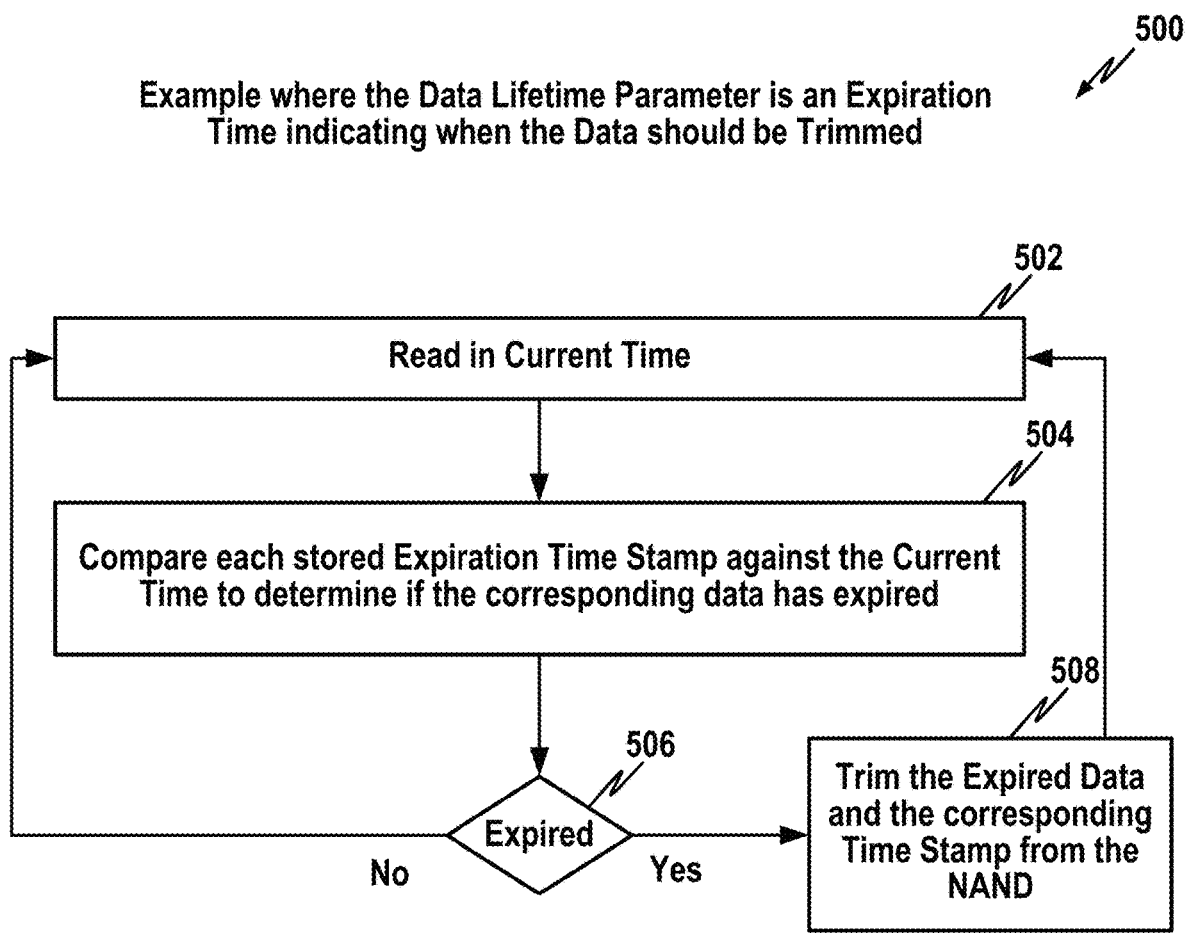
FIG. 5 is a flow chart summarizing an alternative procedure for identifying older (expired) video data, which instead uses time stamps that indicate an expiration date/time.

FIG. 5 illustrates an alternative procedure 500 for trimming data based on an expiration time stamp (i.e. a time stamp indicating when a corresponding portion of data expires). Briefly, at 502, the data storage controller reads in the current time and, at 504, the data storage controller compares each stored expiration time stamp against the current time to determine if corresponding data has expired. If the corresponding data has expired, as determined at decision block 506, the data storage controller trims the expired data and the corresponding time stamp from the NAND, at 508. Otherwise, the controller returns to 502 to update the current time and repeat the process to again identify any data to be trimmed.

Figure 6:
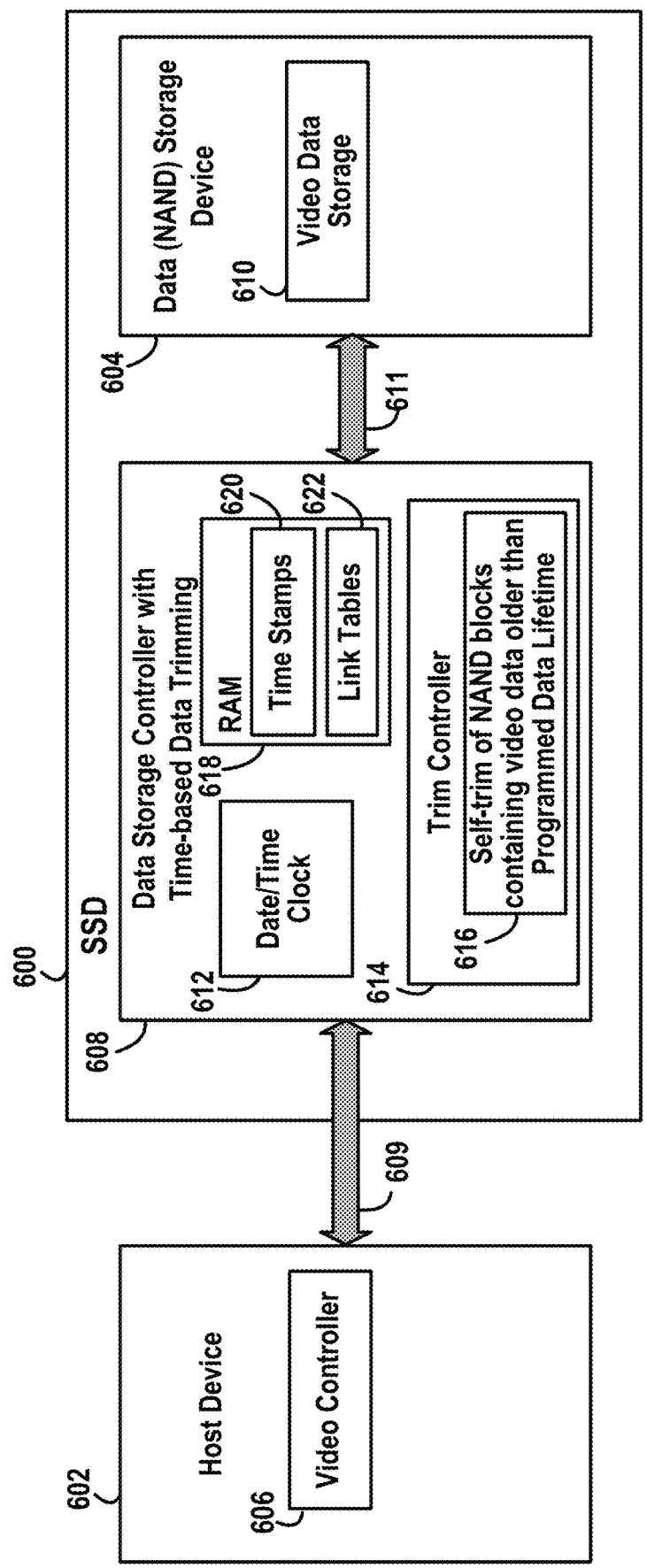
FIG. 6 illustrates an alternative data storage system having a data storage controller that stores time stamps and linking information within a random access memory (RAM).

FIG. 6 illustrates an alternative SSD data storage system example where, instead of storing the time stamps in the NAND along with the video data, the time stamps are stored in RAM within the data storage controller. A linking table is provided to logically link the time stamps in RAM to corresponding portions of data in the NAND. Many of the features of FIG. 6 are similar to those of FIG. 1 and will not be described again in any detail.

Briefly, FIG. 6 shows a data storage system 600 for storing data obtained from a host device 602 in a NAND 604. The data storage system 600 again includes a data storage controller 608 with components for trimming stored data based on the age of the data. For data write operations, the data storage system 600 again obtains data from a video controller 606 of the host device 602 via a bus 609 and stores the data in a video data storage area or component 610 in the NAND 604 via a bus 611 under the control of the data storage controller 608. Rather than storing time stamps in the NAND 604, the time stamps are stored in a time stamp table or array 620 of a RAM 618 of the data storage controller. A link table or link array 622 is also maintained in RAM 618 to logically link each time stamp to a corresponding portion of the video data in the NAND 604. Again, the time stamp may be, for example, a recordation time stamp (that records when a corresponding portion or block of video data was first obtained or recorded) or an expiration time stamp (that instead specifies when a corresponding portion of video data will expire). In either case, a trim controller 616 of the data storage controller 608 uses the current time obtained from a date/time clock 612 along with the time stamps of time stamp array 620 to determine whether any portions of stored data are to be trimmed. If so, a self-trim component 616 of the trim controller 614 uses information in the link table 622 to identify the particular portion of data in the NAND that is to be trimmed (i.e. the particular portion of stored data that corresponds to the particular time stamp that indicated data expiration) and then trims the target data within the NAND 604.

Figure 7:
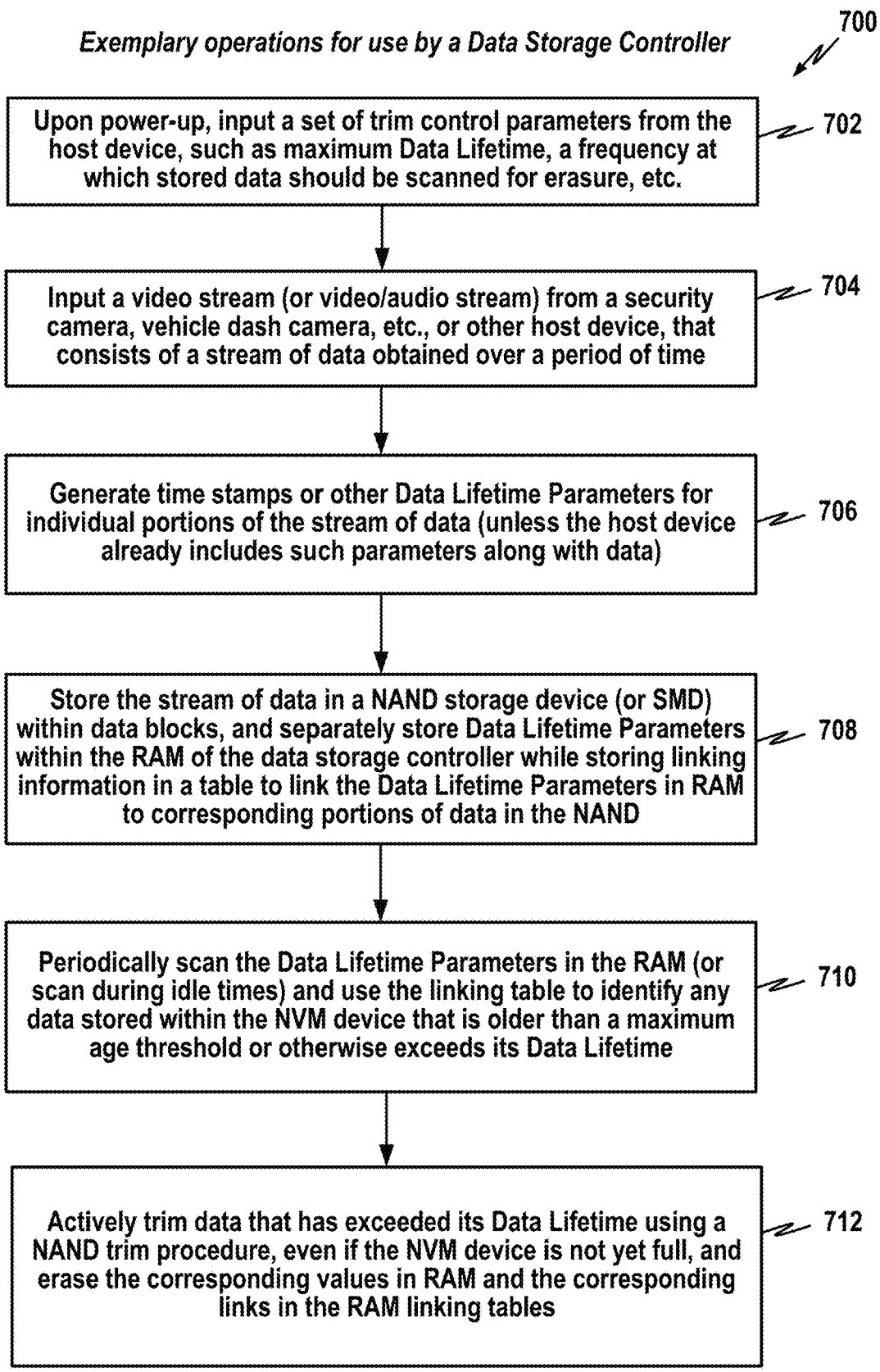
FIG. 7 is a flow chart summarizing video data processing operations performed by the controller of FIG. 6, including operations for trimming older (expired) video data.

FIG. 7 summarizes some of these features via a flowchart 700. Briefly, at 702, upon power-up, the data storage controller inputs a set of trim control parameters from the host device. At 704, the data storage controller inputs a video stream (or other media stream such as video/audio stream) from a host device. At 706, the data storage controller generates time stamps or other data lifetime parameters for individual portions of the stream of data (unless the host device has already appended such parameters to the data). At 708, the data storage controller stores the stream of data in a NAND or other suitable device such as a SMD. At 708, the data storage controller also separately stores the data lifetime parameters within a RAM of the data storage controller while storing linking information in a RAM table to link the data lifetime parameters in the RAM to corresponding portions of data in the NAND. At 710, the data storage controller periodically scans the data lifetime parameters in RAM (or scans the data during idle times) and uses the linking table to identify data stored in the storage device that is older than a maximum age threshold or otherwise exceeds its programmed data lifetime. At 712, the data storage controller actively trims the data that has exceeded its data lifetime using a trim procedure, where the old data is trimmed even if the storage device is not yet full.

Figure 8:
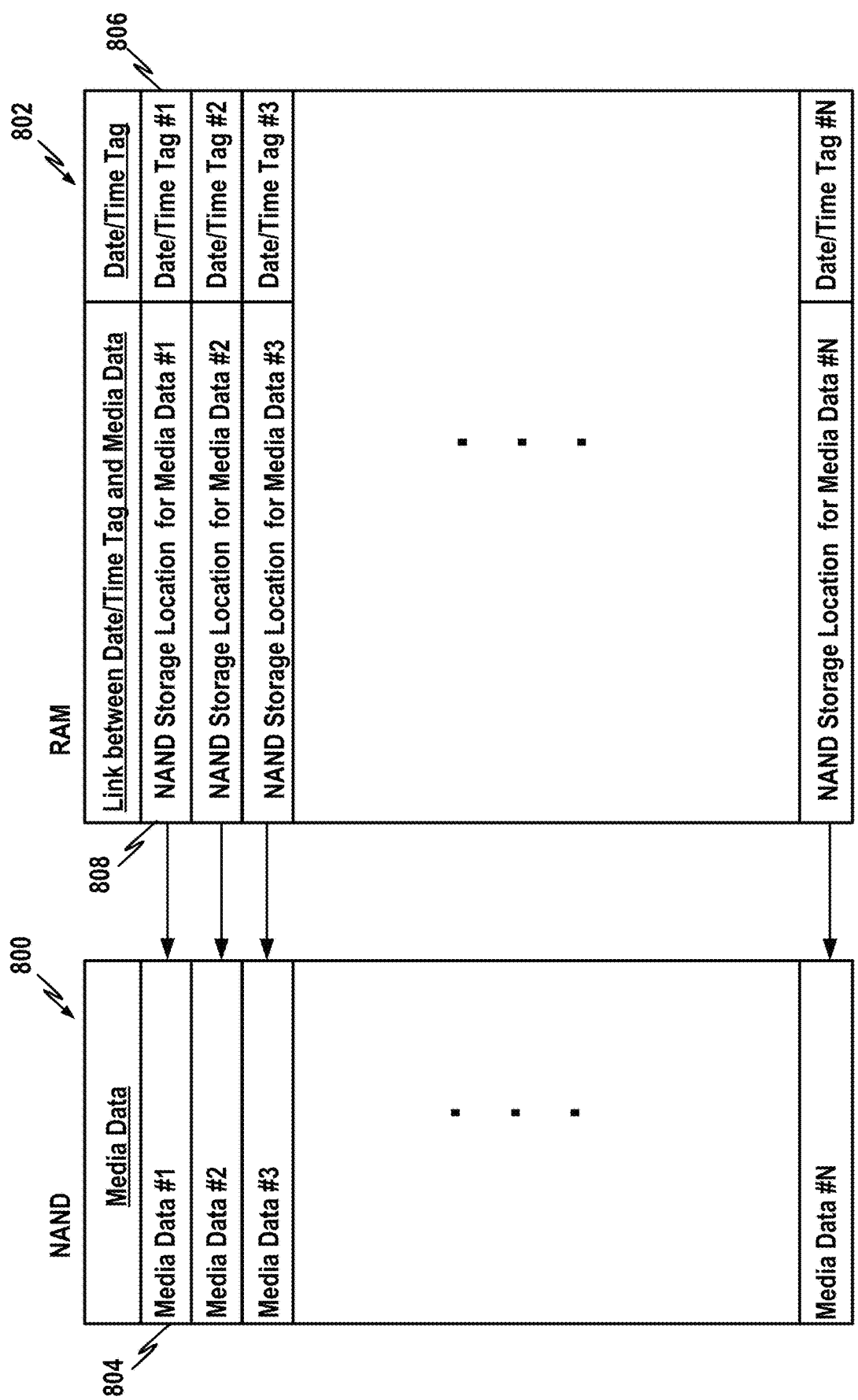
FIG. 8 illustrates a portion of an exemplary NAND memory showing the storage of media data and a portion of an exemplary RAM showing the storage of corresponding time stamps and linking information to allow older (expired) video data to be identified.

FIG. 8 illustrates a portion of a NAND 800 in which media data are stored and a portion of a RAM 802 where time stamps and links are separately stored. Briefly, NAND 800 stores a set of N blocks or strings or portions of media data 804 (such as video data). Each portion of media data 302 might include, for example, one minute of video. The RAM 802 stores N time stamps 806 (referred to as date/time tags in the figure, one for each of the N strings of media data 804 of the NAND) along with N corresponding links 808 that identify the storage location of the corresponding media data in the NAND 800. As already explained, a data storage controller connected to the NAND scans the time stamps of its RAM to identify any that indicate corresponding data to be trimmed. The data storage controller then uses the associated link to locate the particular string or block of media data in the NAND 800 to trim. Once the media data is trimmed, the corresponding time stamp and link are erased.

Figure 9:
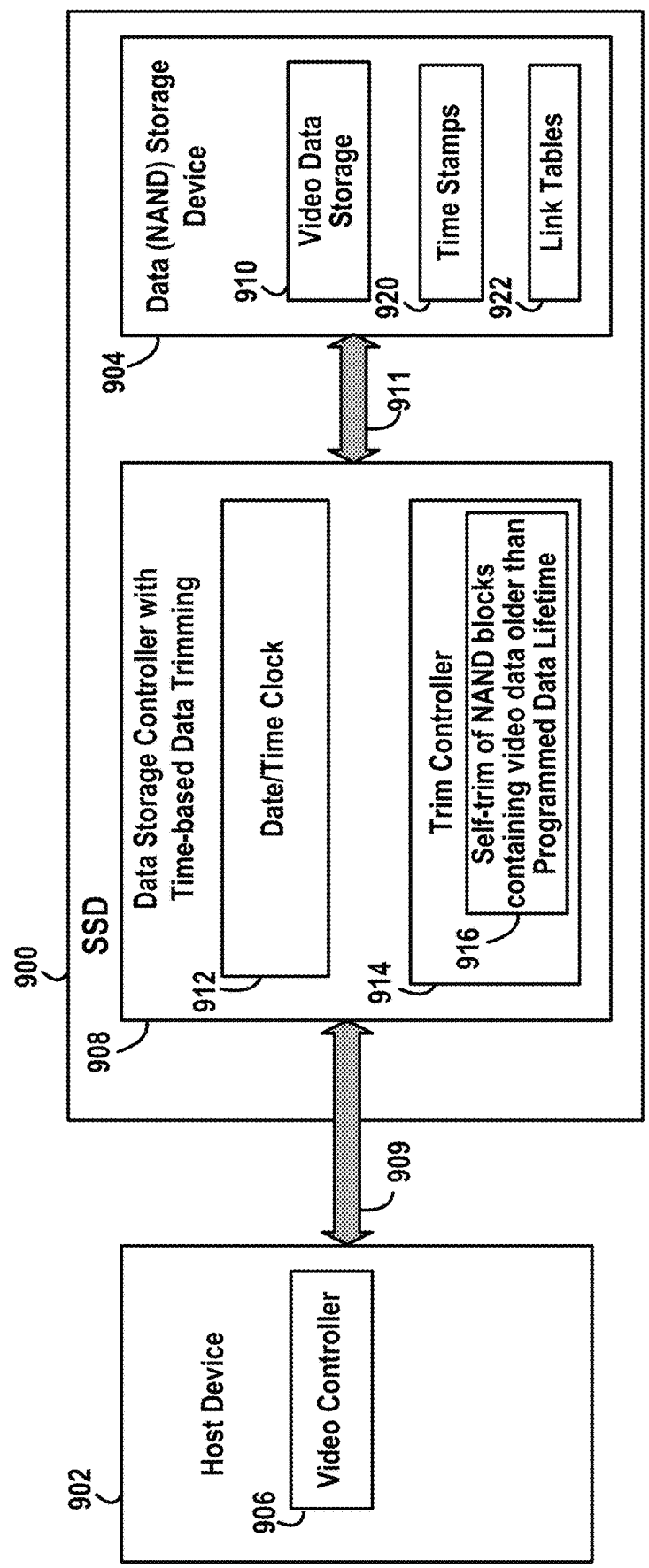
FIG. 9 illustrates an alternative system having a controller that stores time stamps and linking information within the NAND memory, but separate from the media data.

FIG. 9 illustrates an alternative to the example of FIGS. 6-7 where, instead of storing the time stamps and link table in RAM, the time stamps and the link table are stored in the NAND. The example of FIG. 9 differs from the example of FIGS. 1-3 because, with FIG. 9, the time stamps are stored in the NAND separately from the video data and so a link table of the type shown in FIG. 8 is used (maintained in the NAND rather than in RAM).

Briefly, FIG. 9 shows a data storage system 900 for storing data obtained from a host device 902 in a NAND 904. The data storage system 900 again includes a data storage controller 908 with components for trimming stored data based on the age of the data. For data write operations, the data storage system 900 again obtains data from a video controller 906 of the host device 902 via a bus 909 and stores the data in a video data storage area or component 910 in the NAND 904 via a bus 911 under the control of the data storage controller 908. Rather than storing time stamps together with corresponding video data in the NAND 904 (in the manner shown in FIG. 3), the time stamps are stored separately in a time stamp array 920 elsewhere in the NAND 904. A link table or link array 922 is maintained in the NAND 904 (separate from the video data) to link each time stamp in array 920 to a corresponding portion of the video data in video storage 910. Again, a trim controller 914 of the data storage controller 908 may use the current time obtained from a date/time clock 912 along with the time stamps of time stamp array 920 to determine whether any portions of stored data are to be trimmed. If so, a self-trim component 916 of the trim controller 914 uses information in the link table 922 to identify the particular portion of data in the video storage 910 that is to be trimmed and then actively trims the target data within the video storage 910 of the NAND 104.

Figure 10:
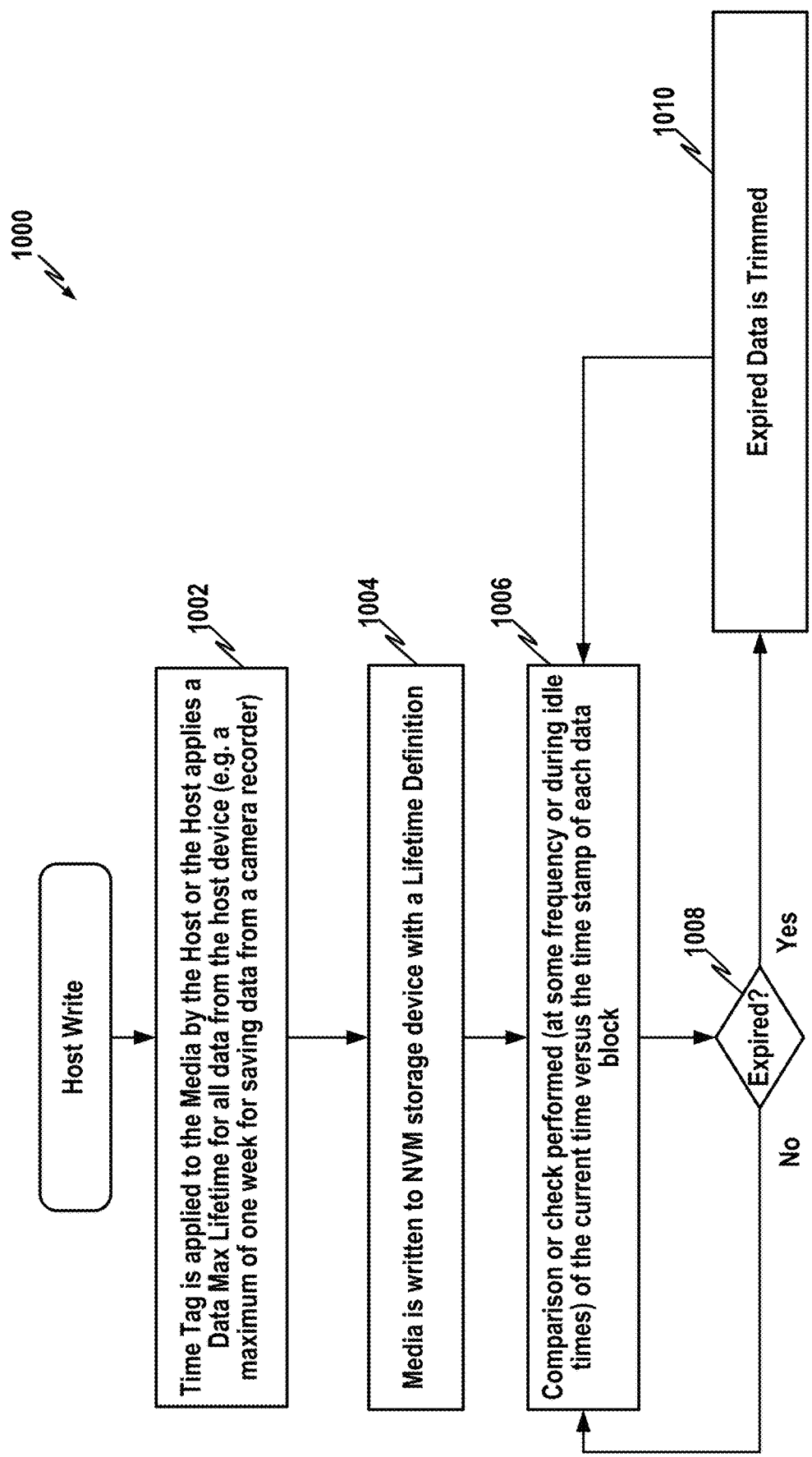
FIG. 10 illustrates a data storage system equipped for use with NVM Express (NVMe), where the controller includes a processor that performs self-trimming operations.

FIG. 10 is a flowchart 1000 that further illustrates some of the features described herein for an example where the host device applies time tags or related parameters to the data. Briefly, at 1002, a Time Tag is applied to the Media by the Host or the Host applies a Data Max Lifetime for all data from the host device (e.g. a maximum of one week for saving data from a camera recorder). At 1004, media is written to NVM storage device with a Lifetime Definition. At 1006, a comparison or check is made (at some frequency or during idle times) of the current time versus the time stamp of each data block. If the data has expired, as determined at 1008, the expired data is trimmed, at 1010.

In the following section, various NVMe-based examples are described.

Exemplary NVMe Embodiments

Figure 11:
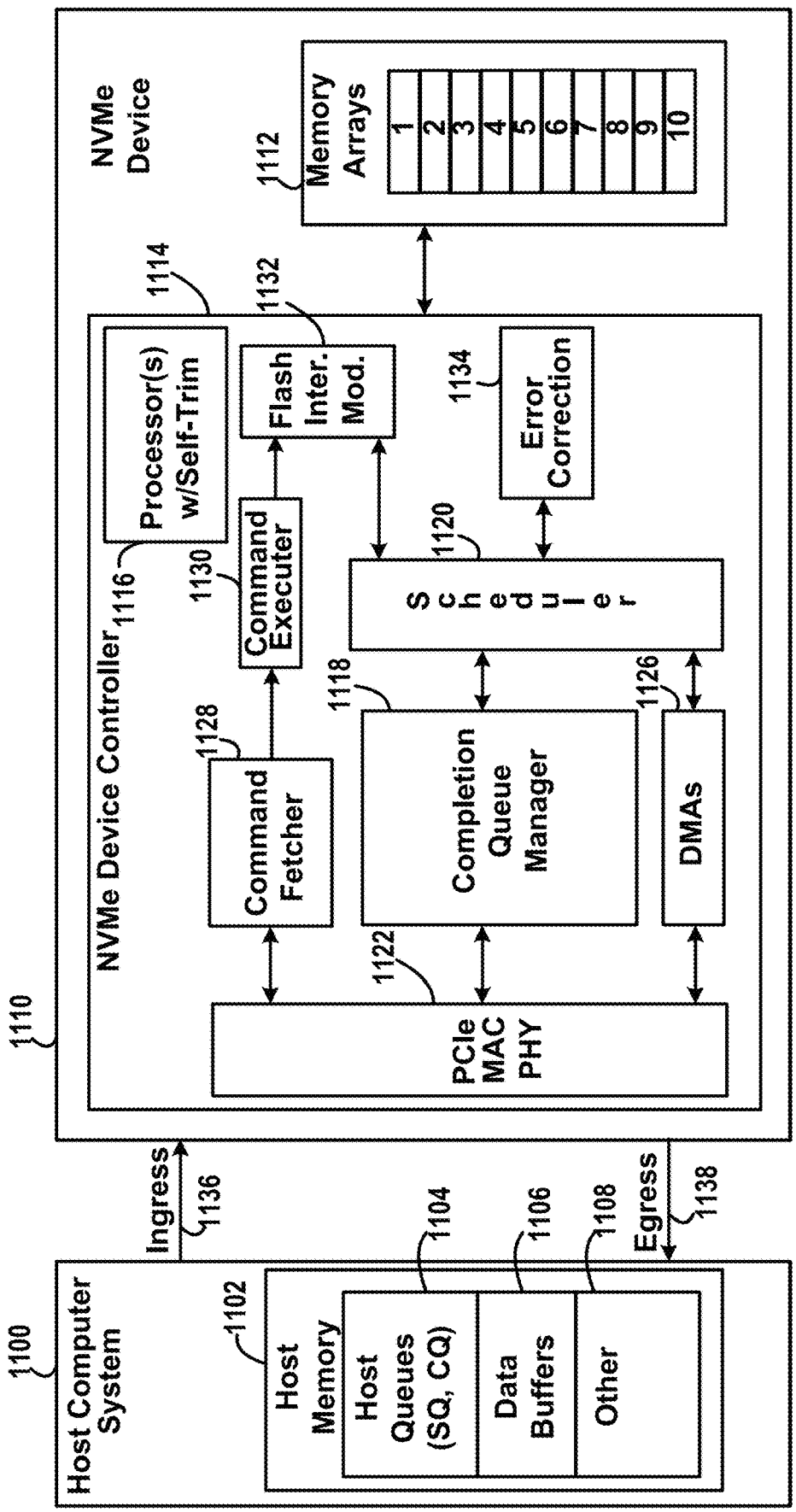
FIG. 11 is a block diagram summarizing selected features of a data storage controller equipped to perform time-based data trimming operations.

FIG. 11 illustrates selected features of an exemplary NVMe architecture in which the above-described self-trim procedures and components may be implemented. In FIG. 11, a host device 1100 may be any suitable computing platform capable of accessing memory on a storage device using NVMe procedures. For example, host device 1100 may be a desktop personal computer, a laptop computer, a tablet computer, a mobile telephone, or a front end to a storage array. The host device 1100 includes internal host memory 1102, which in this example includes host submission and completion queues 1104, data buffers 1106 and other memory components 1108. The host device 1100 may store data in an NVMe storage device 1110. The NVMe device 1110 may be any suitable device that provides non-volatile memory storage for host device 1100 in accordance with NVMe standards. For example, the NVMe device 1110 may be a removable storage device, such as an SSD that is removably connectable to host device 1100. In another example, the NVMe device 1110 may be non-removable or integrated within the host device 1100. The host device 1100 and the NVMe device 1110 of FIG. 11 are communicatively connected via a PCIe bus (represented via ingress 1136 and egress 1138).

The NVMe storage device 1110 of FIG. 11 includes an NVMe controller 1114 and a non-volatile memory array 1112 in which the aforementioned media data are stored. The NVMe device controller 1114 (which may also be referred to herein as a data storage controller) controls access to the non-volatile memory array 1112 (such as a NAND). The NVMe controller 1114 thus may be a non-volatile memory controller that implements or supports the NVMe protocols, and non-volatile memory array 1112 may be 2D or 3D NAND flash memory. The NVMe controller 1114 includes one or more processors 1116 that include components for performing self-trimming operations. (Although not shown in FIG. 11, RAM may be used in some examples to store time stamps and links, as discussed above). The processor(s) 1116 are also responsible for the execution of Frond-End and Back-End tasks.

A command fetcher 1128 is responsible for fetching and parsing commands from the host 1100 and queuing the commands internally. Fetching and parsing may involve obtaining submission requests from a submission queue of the host queues 1104 and routing those requests to a flash interface module 1132. A command executor 1130 is responsible for the arbitrating and executing the commands. A completion queue manager 1118 routes completion entries received from a scheduler 1120 to a completion queue within host queues 1104 of the host device 1100 via the PCIe MAC PHY interface 1122. Actual pages of data to be delivered to the host device 1100 (such as the result of read commands from arrays 1112) are delivered using one or more DMAs 1126. Additional components of the controller 1114 include the flash interface module 1132, which is responsible for controlling and accessing the memory arrays 1112, and an error correction module 1134 (responsible for error correction).

Note that, in an exemplary implementation, the only components that are modified relative to a standard NVMe device controller are the processor(s) 1116 (as well as the software/firmware associated with the processors 1116) and associated RAM (which may be modified to provide storage of time stamps and links). The trimming operations described herein may be transparent to the other components of the NVMe device 1110. That is, only minimal changes are made to otherwise standard NVMe systems to implement self-trimming.

As explained in Section 6.7.1.1 of NVMe Revision 1.3, NVMe provides for deallocation using a Dataset Management Command. A version of the NVMe deallocate function may be exploited (under the controller of the processor(s) 1118) to perform or implement the aforementioned trim operations.

Further Exemplary Methods and Embodiments

FIGS. 12-15 illustrate and summarize various general features of exemplary data storage controllers and methods, or procedures for use with data storage controllers.

Figure 12:
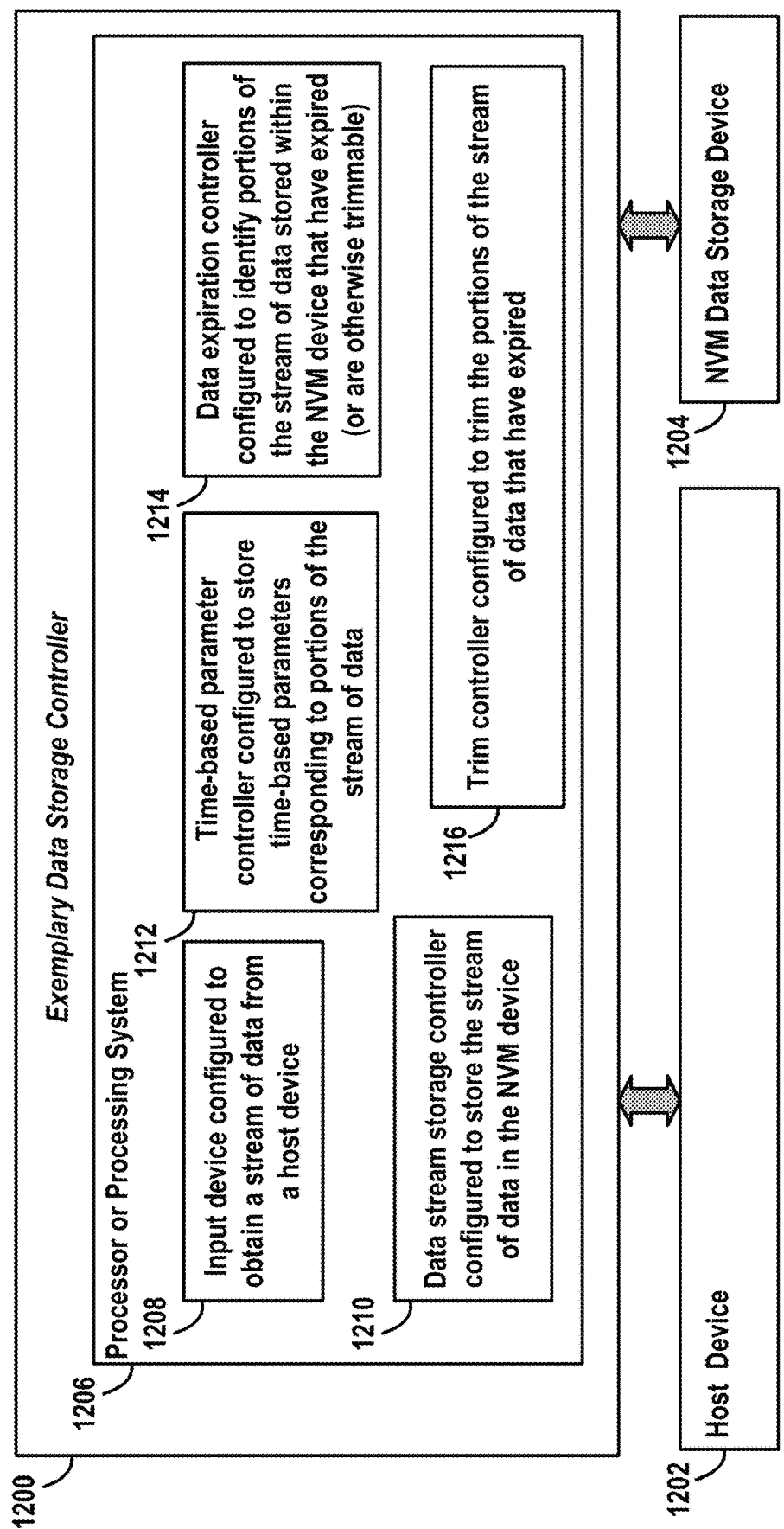
FIG. 12 is a block diagram summarizing further selected features of the data storage controller of FIG. 11 that is equipped to perform time-based data trimming operations.

FIG. 12 shows an exemplary data storage controller 1200 (or memory controller or device controller) configured to communicate with a host device 1202 and a data storage device 1204, wherein the data storage controller 1200 may access the data storage device 1204 based on commands issued to the data storage controller 1200 by the host device 1202. Although many examples described herein relate to NVMe controllers for storing data within NAND devices, the data storage device 1204 may be any suitable memory or storage device and is not limited to NANDs, and the data storage controller 1200 may be any suitable memory controller device and is not limited to NVMe-based controllers.

The exemplary data storage controller 1200 of FIG. 12 includes a processing system or processor 1206 configured for performing time-based trimming operations. In particular, the exemplary processor 1206 includes an input device 1208 configured to obtain a stream of data from a host device and a data stream storage controller 120 configured to store the stream of data in the NVM device. A time-based parameter controller 1212 is configured to store time-based parameters corresponding to portions of the stream of data. A data expiration controller 1214 is configured to identify portions of the stream of data stored within the NVM device that have expired (or are otherwise trimmable). A trim (or self-trim) controller 1216 is configured to trim the portions of the stream of data that have expired.

Figure 13:
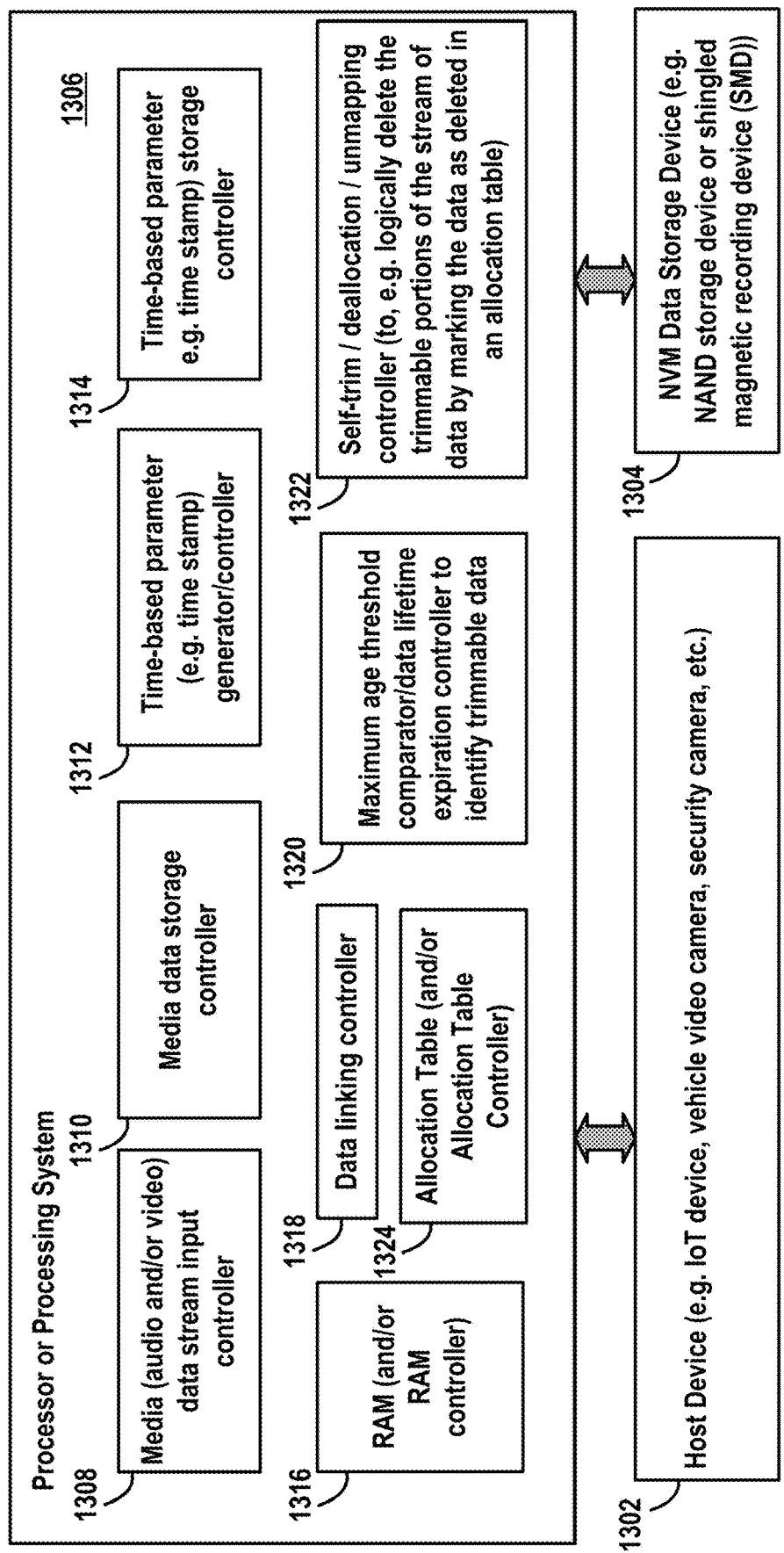
FIG. 13 is a block diagram summarizing still other features of the data storage controller of FIG. 11 that is equipped to perform time-based data trimming operations.

FIG. 13 illustrates additional or alternative components of an exemplary processor or processing system 1306 configured to control a data storage device 1304 based on data and commands received from a host device 1302. In the example of FIG. 13, the host device 1302 is, for example, an IoT device, vehicle video camera, security camera, etc. The data storage device 1304 is a NAND or an SMD (but could be other NVM devices as well). The processor 1306 of FIG. 13 includes a media data stream input controller 1308 configured to control obtaining media data (such as audio and/or video data) from the host device 1302. A media data storage controller 1310 is configured to control the storage of the media data in the NVM device 1304. A time-based parameter generator/controller 1312 is configured to control obtaining or generating time stamps or other time-based parameters. If such time stamps are provided along with the media data from the host device 1302, then the time-based parameter generator/controller 1312 controls the obtaining of the time stamps. If such time stamps are not provided along with the media data from the host device 1302, then the time-based parameter generator/controller 1312 controls the generation of the time stamps.

A time-based parameter storage controller 1314 controls the storage of the time stamps or other time-based parameters. Depending on the implementation, the time stamps may be stored in the NVM device 1304 or in a RAM under the control of a RAM controller 1316. A data linking controller 1318 controls the generation and storage of linking information that logically links the time-based parameters to corresponding portions of the media data. Such linking data, if needed, may be stored in the NVM device 1304 or in RAM. A maximum age threshold comparator/data lifetime expiration controller 1320 is configured to determine when a portion of the media data stored in the NVM device 1304 has expired to identify trimmable data. A self-trim/deallocation/unmapping controller 1322 is configured to trim blocks within the NVM 1304 corresponding to the portion of data deemed to be trimmable. For example, controller 1322 may be configured to logically delete the portions of the stream of data by marking the data as deleted in an allocation table 1324. In other examples, the allocation table might be within the NVM device 1304.

In at least some examples, means may be provided for performing the functions illustrated in FIGS. 12 and 13 and/or other functions illustrated or described herein. For example, an apparatus (e.g. processing system 1206 of FIG. 12) may be provided for use with a data storage device (e.g. storage device 1204) where the apparatus includes: means (such as component 1208) for obtaining a stream of data from a host device; means (such as component 1210) for storing an input stream of data in the NVM device; means (such as component 1212) for storing data expiration parameters corresponding to portions of the input stream of data; means (such as component 1214) for identifying portions of the input stream of data stored within the NVM device that have expired (or are otherwise trimmable) based on the data expiration parameters; and means (such as component 1216) for trimming the portions of the stream of data stored in the NVM device that have expired.

Still further, means (such as component 1308 of FIG. 13) may be provided for controlling or obtaining media data (such as audio and/or video data) from the host device 1302. Means (such as media data storage controller 1310) may be provided for controlling the storage of the media data in the NVM device 1304. Means (such as time-based parameter generator/controller 1312) may be provided for controlling or obtaining or generating time stamps or other time-based parameters. Means (such as time-based parameter storage controller 1314) may be provided for controlling the storage of the time stamps or other time-based parameters. Means (such as data linking controller 1318) may be provided for controlling the generation and storage of linking information that logically links the time-based parameters to corresponding portions of the media data. Means (such as controller 1320) may be provided for determining when a portion of the media data stored in the NVM device 1304 has expired to identify trimmable data. Means (such as controller 1322) may be provided for trimming blocks within the NVM 1304 corresponding to the portion of data deemed to be trimmable. The means for trimming (e.g. component 1322) may include means for logically deleting the portions of the stream of data by marking the data as deleted in an allocation table (such as table 1324). These are just some examples of means for performing the various functions described herein.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIGS. 12 and 13 and/or other functions illustrated or described herein. For example, instructions may be provided for: obtaining a stream of data from a host device; storing an input stream of data in the NVM device; storing data expiration parameters corresponding to portions of the input stream of data; subsequently identifying portions of the input stream of data stored within the NVM device that have expired (or are otherwise trimmable) based on the data expiration parameters; and trimming the portions of the stream of data stored in the NVM device that have expired.

Still further, instructions may be provided for: controlling or obtaining media data (such as audio and/or video data) from a host device; controlling the storage of the media data in the NVM device; controlling or obtaining or generating time stamps or other time-based parameters; controlling the storage of the time stamps or other time-based parameters; controlling the generation and storage of linking information that links the time-based parameters to corresponding portions of the media data; determining when a portion of the media data stored in the NVM device has expired (or is otherwise trimmable); trimming or self-trimming blocks within the NVM device corresponding to the portion of data deemed to be trimmable. The instructions for storing the input stream of data may include instructions for storing the input stream of data in blocks within a NAND storage device. The instructions for trimming may include instructions for logically deleting the portions of the stream of data by marking the data as deleted in an allocation table. These are just some examples of suitable instructions for performing or controlling the various functions or operations described herein.

Figure 14:
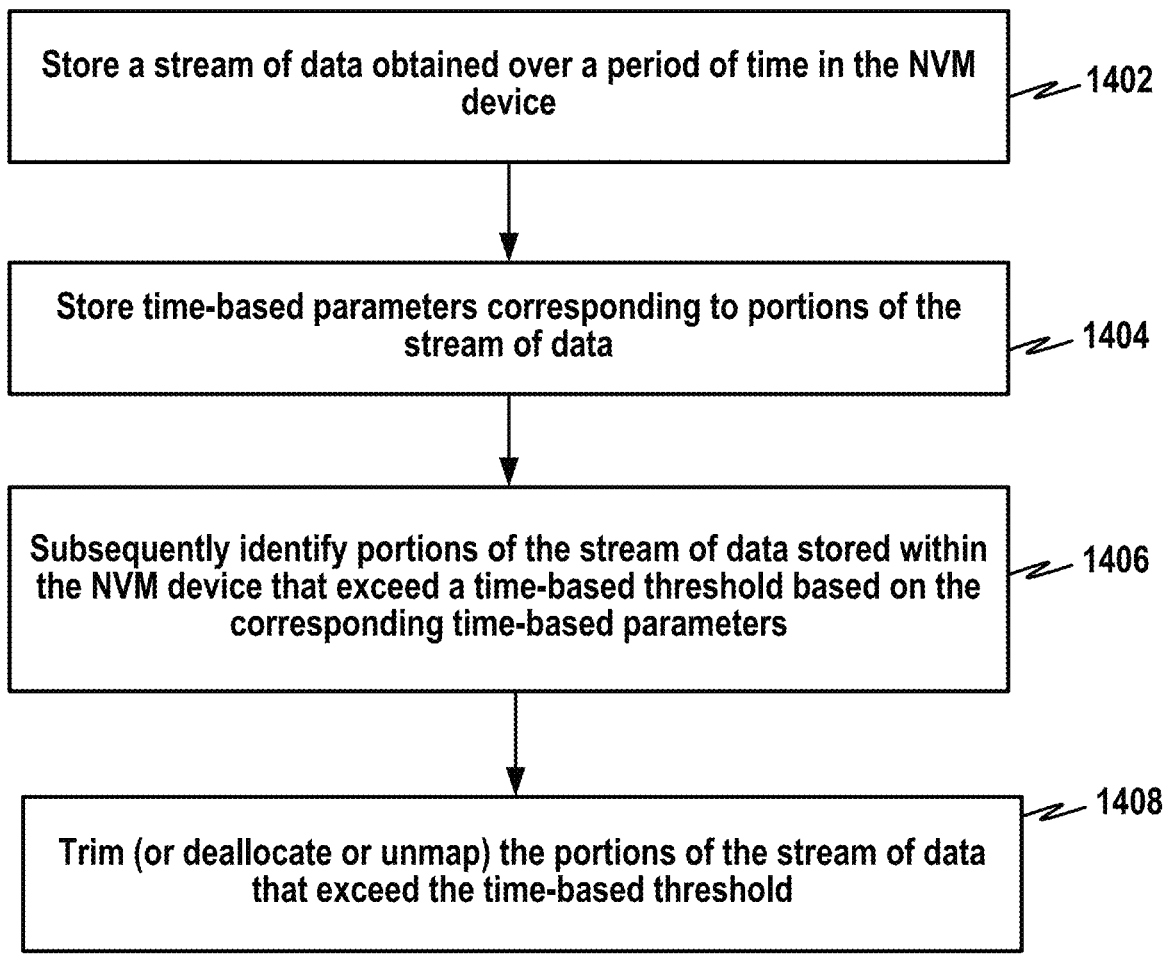
FIG. 14 is a flow chart summarizing selected operations of a data storage controller or other suitable device equipped to perform time-based data trimming operations.

FIG. 14 broadly summarizes exemplary operations 1400 for use by or with a data storage controller or other suitable device. Briefly, at 1402, the data storage controller stores a stream of data obtained over a period of time in the NVM device, such as video data obtained continuously or periodically over an extended interval of time (of weeks, months, etc.). At 1404, the data storage controller stores time-based parameters (such as time stamps) corresponding to portions of the stream of data. At 1506, the data storage controller subsequently identifies portions of the stream of data stored within the NVM device that exceed a time-based threshold (such as a maximum data lifetime parameter) based on the corresponding time-based parameters. At 1408, the data storage controller trims (or deallocates or unmaps) the portions of the stream of data that exceed the time-based threshold by, for example, logically deleting the portions of the stream of data by marking the data as deleted in an allocation table). The various features of FIG. 14 are described in detail above.

Figure 15:
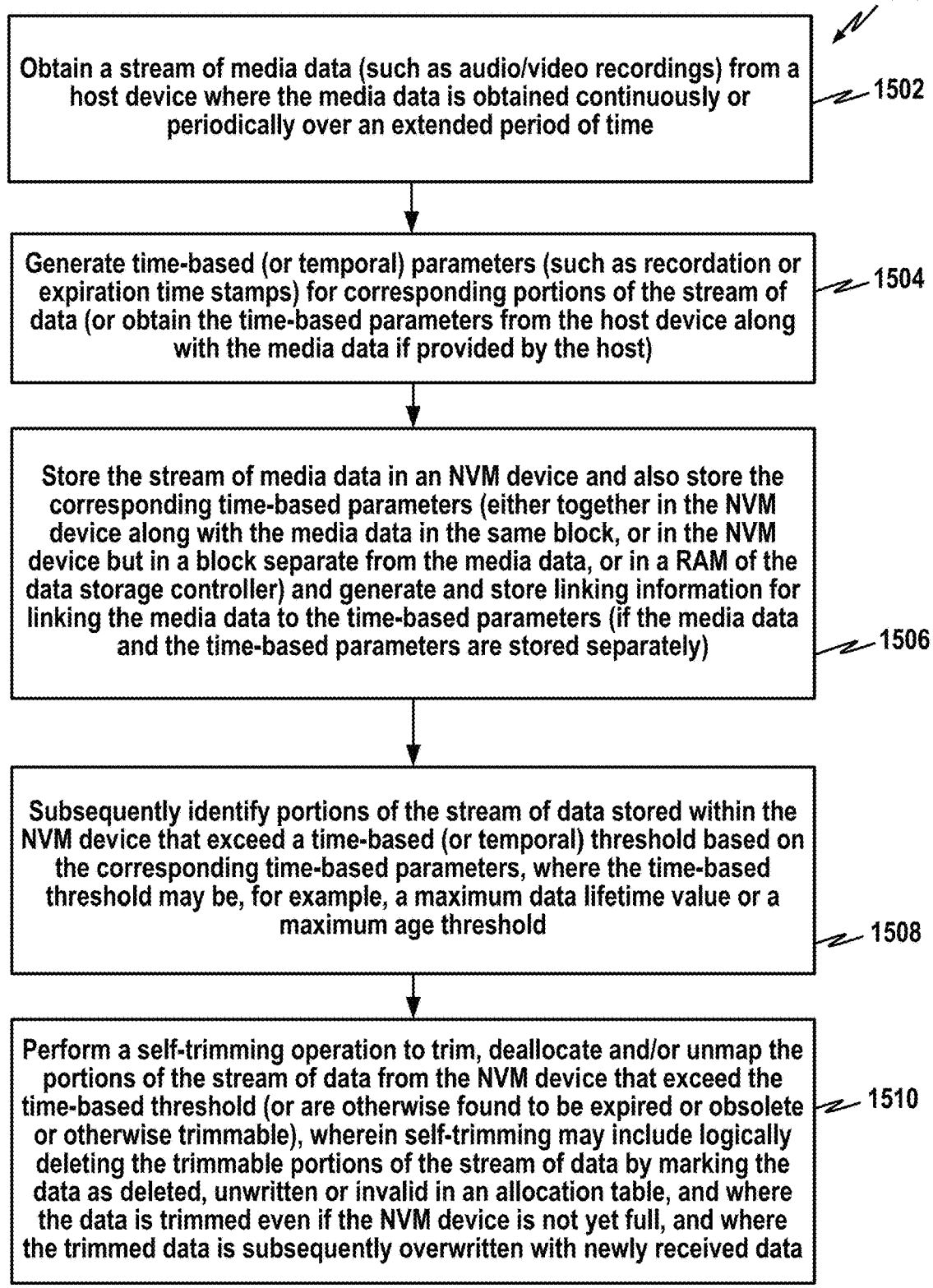
FIG. 15 is a flow chart summarizing further selected operations of a data storage controller or other suitable device equipped to perform time-based data trimming.

FIG. 15 further summarizes exemplary operations 1500 for use by or with a data storage controller or other suitable device. At 1502, the data storage controller obtains a stream of media data (such as audio/video recordings) from a host device where the media data is obtained continuously or periodically over an extended period of time. At 1504, the data storage controller generates time-based (or temporal) parameters (such as recordation or expiration time stamps) for corresponding portions of the stream of data (or obtain the time-based parameters from the host device along with the media data if provided by the host). At 1506, the data storage controller stores the stream of media data in an NVM device and also store the corresponding time-based parameters (either together in the NVM device along with the media data in the same block, or in the NVM device but in a block separate from the media data, or in a RAM of the data storage controller) and generates and stores linking information for linking the media data to the time-based parameters (if the media data and the time-based parameters are stored separately).

At 1508, the data storage controller subsequently identifies portions of the stream of data stored within the NVM device that exceed a time-based (or temporal) threshold based on the corresponding time-based parameters, where the time-based threshold may be, for example, a maximum data lifetime value or a maximum age threshold. At 1510, the data storage controller performs a self-trimming operation to trim, deallocate and/or unmap the portions of the stream of data that exceed the time-based threshold (or are otherwise found to be expired or obsolete or otherwise trimmable), wherein self-trimming may include logically deleting the trimmable portions of the stream of data by marking the data as deleted, unwritten or invalid in an allocation table, and where the data is trimmed even if the NVM device is not yet full. The trimmed data is subsequently overwritten by newly received data in the same physical location of the NAND. (The various features of FIG. 15 are described in detail above.

The subject matter described herein can be implemented in any suitable NAND flash memory, including 2D or 3D NAND flash memory. Semiconductor memory devices include volatile memory devices, such as DRAM) or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage controller for controlling a non-volatile memory (NVM) device, comprising:
storing a stream of data obtained over a period of time in the NVM device;
storing time-based parameters corresponding to portions of the stream of data;
subsequently scanning the NVM device in accordance with self-trim control parameters to identify portions of the stream of data stored within the NVM device that exceed a time-based threshold based on the corresponding time-based parameters, the self-trim control parameters indicating different operations depending on whether the data storage controller is idle or not; and
performing self-trim operations in accordance with the self-trim control parameters and based on whether the data storage controller is idle or not to selectively trim the portions of the stream of data within the NVM device that exceed the time-based threshold.

2. The method of claim 1, wherein trimming the portions of the stream of data comprises marking the portions of the stream of data as one or more of deleted, invalid or unwritten in an allocation table, the allocation table within one or more of the data storage controller or the NVM device.

3. The method of claim 1, wherein the time-based parameters comprise time stamps and wherein the time-based threshold comprises a maximum age threshold.

4. The method of claim 1, further comprising:
obtaining the stream of data from a host device; and
generating the time-based parameters within the data storage controller.

5. The method of claim 1, wherein the time-based parameters are stored in the NVM device along with corresponding streams of data within a same block of data, and wherein trimming the portions of the stream of data includes trimming an entire block of data in which the portions of the stream of data are stored.

6. The method of claim 1, wherein the time-based parameters are stored separately from corresponding portions of the stream of data, and wherein the data storage controller maintains linking information relating the time-based parameters to the corresponding portions of the stream of data.

7. The method of claim 1, wherein the portions of the stream of data that exceed the time-based threshold are trimmed even if the NVM device is not full.

8. The method of claim 1, wherein the stream of data comprises one or more of video data and audio data.

9. The method of claim 1, wherein the self-trim control parameters control the data storage controller to (a) scan the NVM device whenever the data storage controller is idle and (b) scan the NVM device periodically while the data storage controller is not idle.

10. The method of claim 9, wherein the self-trim control parameters specify a frequency for scanning the NVM device while the data storage controller is not idle.

11. The method of claim 1, further comprising selecting an amount of memory in the NVM device devoted to over-provisioning based on an amount of self-trimming performed, with the amount selected to reduce write amplification in the NVM device.

12. A data storage controller for controlling a non-volatile memory (NVM) device, comprising:
a data stream storage controller configured to store a stream of data obtained from a host device in the NVM device;
a time-based parameter storage controller configured to store time-based parameters corresponding to portions of the stream of data;
a data expiration controller configured to scan the NVM device in accordance with self-trim control parameters to identify portions of the stream of data stored within the NVM device that have expired, the self-trim control parameters indicating different operations depending on whether the data storage controller is idle or not; and
a trim controller configured to execute self-trim operations in accordance with the self-trim control parameters and based on whether the data storage controller is idle or not to selectively trim the portions of the stream of data within the NVM device that have expired.

13. The data storage controller of claim 12, further comprising:
a time-based parameter generator configured to generate the time-based parameters.

14. The data storage controller of claim 13, wherein the trim controller is configured to trim the portions of the stream of data that have expired by deallocating at least some portions of the stream of data from allocation tables associated with the NVM device, the allocation tables within one or more of the data storage controller or the NVM device.

15. The data storage controller of claim 12, wherein the data storage controller further comprises a data linking controller configured to maintain information relating the time-based parameters to corresponding portions of the stream of data stored in the NVM device.

16. The data storage controller of claim 12, wherein the host device is one or more of a vehicle video camera, a security camera, and an Internet of Things (IoT) device.

17. The data storage controller of claim 12, wherein the self-trim control parameters are configured to control the data storage controller to (a) scan the NVM device whenever the data storage controller is idle and (b) scan the NVM device periodically while the data storage controller is not idle.

18. The data storage controller of claim 17, wherein the self-trim control parameters are configured to specify a frequency for scanning the NVM device while the data storage controller is not idle.

19. The data storage controller of claim 12, wherein the data stream storage controller is further configured to select an amount of memory in the NVM device devoted to over-provisioning based on an amount of self-trimming performed, with the amount selected to reduce write amplification in the NVM device.

20. A data storage system, comprising:
a non-volatile memory (NVM) device; and
a data storage controller having a processor configured to
store a stream of input data obtained from a host device in the NVM device,
store time-based parameters corresponding to portions of the stream of data,
scan the NVM device in accordance with self-trim control parameters to identify portions of the stream of data stored within the NVM device that are older than a maximum permissible age, the self-trim control parameters indicating different operations depending on whether the data storage controller is idle or not, and perform self-trim operations in accordance with the self-trim control parameters and based on whether the data storage controller is idle or not to selectively trim the portions of the stream of data stored in the NVM device identified as older than the maximum permissible age.

21. The data storage system of claim 20, wherein the self-trim control parameters are configured to control the data storage system (a) scan the NVM device whenever the data storage controller is idle and (b) scan the NVM device periodically while the data storage controller is not idle.

22. An apparatus for controlling a non-volatile memory (NVM) device, comprising:

means for storing an input stream of data in the NVM device, the means for storing being a component of a data storage controller;

means for storing data expiration parameters corresponding to portions of the input stream of data;

means for scanning the NVM device in accordance with self-trim control parameters to identify portions of the input stream of data stored within the NVM device that have expired based on the data expiration parameters, the self-trim control parameters indicating different operations depending on whether the data storage controller is idle or not; and means for performing self-trim operations in accordance with the self-trim control parameters and based on whether the data storage controller is idle or not to selectively trim the portions of the stream of data stored in the NVM device that have expired.

23. The apparatus of claim 22, further comprising:

means for generating the data expiration parameters as the input stream of data is obtained from a host device.

24. The apparatus of claim 23, wherein the means for trimming includes means for logically deleting the portions of the stream of data from the NVM device.

25. The apparatus of claim 22, wherein the self-trim control parameters are configured to control the means for scanning to (a) scan the NVM device whenever the data storage controller is idle and (b) scan the NVM device periodically while the data storage controller is not idle.

\* \* \* \* \*